(12) United States Patent
Sakamoto

(10) Patent No.: US 8,259,365 B2
(45) Date of Patent: Sep. 4, 2012

(54) ORIGINAL SCANNING APPARATUS AND CONTROL METHOD THEREOF

(75) Inventor: Masahiro Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 12/625,636

(22) Filed: Nov. 25, 2009

(65) Prior Publication Data

US 2010/0142006 A1 Jun. 10, 2010

(30) Foreign Application Priority Data

Dec. 5, 2008 (JP) ................................. 2008-311557

(51) Int. Cl.
*H04N 1/04* (2006.01)

(52) U.S. Cl. ......................... 358/474; 358/514; 358/497

(58) Field of Classification Search .................. 358/474, 358/597, 514, 505, 513, 494, 489
See application file for complete search history.

(56) References Cited

U.S. PATENT DOCUMENTS

| | | | |
|---|---|---|---|
| 4,821,099 A | 4/1989 | Sakamoto | |
| 4,827,351 A | 5/1989 | Sakamoto | |
| 5,144,555 A * | 9/1992 | Takadachi et al. | 715/209 |
| 5,151,640 A | 9/1992 | Sakamoto et al. | |
| 6,661,541 B1 * | 12/2003 | Chang | 358/474 |
| 6,775,700 B2 * | 8/2004 | Cheng et al. | 709/225 |
| 7,221,485 B2 * | 5/2007 | Naito et al. | 358/474 |
| 7,715,067 B2 * | 5/2010 | Tsai et al. | 358/497 |
| 7,755,814 B2 * | 7/2010 | Tamai et al. | 358/497 |
| 7,961,361 B2 * | 6/2011 | Kawai | 358/474 |
| 2002/0186426 A1 * | 12/2002 | Sakai | 358/505 |
| 2006/0023265 A1 * | 2/2006 | Yoon | 358/474 |
| 2007/0146813 A1 | 6/2007 | Sakamoto | |

FOREIGN PATENT DOCUMENTS

| | | |
|---|---|---|
| JP | 5-199375 | 8/1993 |
| JP | 11-215310 | 8/1999 |
| JP | 2007-158859 | 6/2007 |

* cited by examiner

*Primary Examiner* — Negussie Worku

(74) *Attorney, Agent, or Firm* — Fitzpatrick, Cella, Harper & Scinto

(57) ABSTRACT

An original scanning apparatus is described that scans an original placed on an original placing plane line by line by moving a scanning unit including a plurality of light-receiving elements that are arranged in a prescribed direction in a direction perpendicular to the prescribed direction. The original scanning apparatus includes: a pattern unit that is provided in a vicinity of a side of the rectangular original placing plane extending along a moving direction of the scanning unit; a control unit configured to calculate drive information in the moving direction per line-scanning cycle of the scanning unit based on a result of scanning the pattern unit; and a driving circuit configured to feed back the calculated drive information so as to control the scanning unit to thereby drive the scanning unit in the moving direction.

6 Claims, 7 Drawing Sheets

ORIGINAL SCANNING APPARATUS AND CONTROL METHOD THEREOF

BACKGROUND OF THE INVENTION

1. Field of the Invention

The present invention relates to an original scanning apparatus and a control method thereof.

2. Description of the Related Art

A technique for controlling the moving speed of an optical system in an original scanning apparatus is known. Japanese Patent Laid-Open No. 05-199375 discloses a technique in which, when scanning an original, a strip-shaped pattern formed on the contact glass is detected by a solid-state image sensor, and the position and speed of the optical system is controlled based on the detected strip-shaped pattern.

According to Japanese Patent Laid-Open No. 05-199375, the strip-shaped pattern is formed on the contact glass so that the brightness information changes at a regular interval in the sub-scanning direction of the solid-state image sensor, and a plurality of types of strip-shaped patterns that have different pitches are prepared to cope with different linear speeds. The solid-state image sensor outputs one line's worth of signal in a prescribed cycle.

In the above-described technique, the strip-shaped pattern is scanned by the solid-state image sensor. Accordingly, the scan timing of the strip-shaped pattern is limited to the scan timing of the solid-state image sensor, so it is difficult to obtain highly precise information regarding the position and speed of the optical system.

To obtain highly precise information, it is necessary to obtain precise information regarding a black/white border point of the strip-shaped pattern. To obtain such information regarding a black/white border point of the strip-shaped pattern, it is necessary to sufficiently lower the line-scanning speed of the solid-state image sensor with respect to the moving speed of the optical system. However, since there is a limit on how much the speed of the light-receiving can be increased, there is no way but to slow down the moving speed of the optical system.

Also, with the above-described technique, in order to cope with scan modes of different linear speeds, it is necessary to prepare a plurality of strip-shaped patterns that have different pitches.

SUMMARY OF THE INVENTION

The present invention provides an original scanning apparatus wherein precise drive information in the sub-scanning direction can be acquired while maintaining the line-scanning speed of the scanning unit, and a control method of such an original scanning apparatus.

According to a first aspect of the present invention there is provided An original scanning apparatus that scans an original placed on a original placing plane line by line by moving a scanning unit comprising a plurality of light-receiving elements that are arranged in a prescribed direction in a direction perpendicular to the prescribed direction, the apparatus comprising: a pattern unit that is provided in a vicinity of a side of the original placing plane extending along a moving direction of the scanning unit; a control unit configured to calculate drive information in the moving direction per line-scanning cycle of the scanning unit based on a result of scanning the pattern unit by using a plurality of light-receiving elements that are provided at a position corresponding to the pattern unit from among the plurality of light-receiving elements; and a driving circuit configured to feed back the drive information calculated by the control unit so as to control the scanning unit to thereby drive the scanning unit in the moving direction, wherein, in the pattern unit, a line that has a slant with respect to the prescribed direction is formed at a regular interval in the moving direction of the scanning unit.

According to a second aspect of the present invention there is provided a control method of an original scanning apparatus that scans an original placed on a original placing plane line by line by moving a scanning unit comprising a plurality of light-receiving elements that are arranged in a prescribed direction in a direction perpendicular to the prescribed direction, the method comprising steps of: controlling so as to calculate drive information in a moving direction per line-scanning cycle of the scanning unit based on a result of scanning a pattern unit that is provided in a vicinity of a side of the original placing plane extending along the moving direction of the scanning unit by using a plurality of light-receiving elements that are provided at a position corresponding to the pattern unit from among the plurality of light-receiving elements; and controlling the scanning unit so as to drive the scanning unit in the moving direction by feeding back the drive information calculated in the control step, wherein, in the pattern unit, a line that has a slant with respect to the prescribed direction is formed at a regular interval in the moving direction of the scanning unit.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1A:
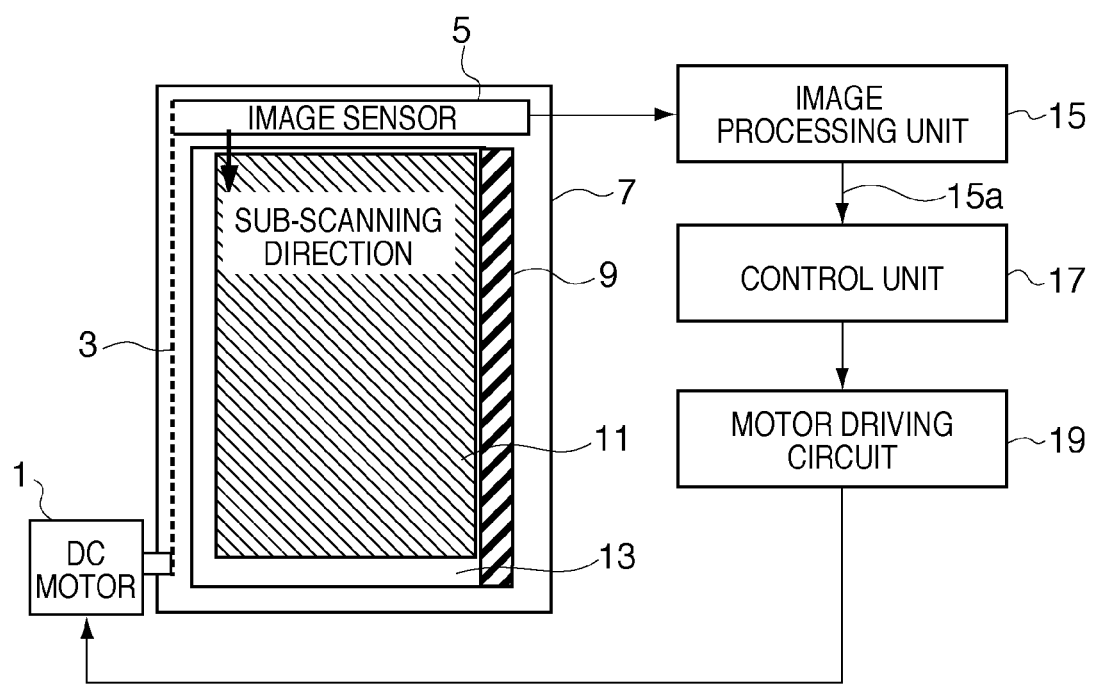
FIG. 1A is a diagram showing an example of a configuration of an original scanning apparatus according to an embodiment of the present invention.

FIG. 1A is a diagram showing an example of a configuration of an original scanning apparatus according to an embodiment of the present invention.

An image sensor (line sensor) 5 includes a plurality of light-receiving elements (sensors) that are arranged in a prescribed direction (hereinafter referred to as the main-scanning direction), and functions as a scanning unit. The image sensor 5 scans an original 11 line by line, and outputs an analog image signal based on the results of scanning to an image processing unit 15. The image processing unit 15 converts the input analog image signal into a digital signal, and outputs the digital image signal to a control unit 17. This output is performed via a signal line 15*a*. For the sake of simplicity of the description, the present embodiment will be described in the context of the digital image signal being a binary signal, but the present invention is not limited thereto.

An original placing unit 7 can be, for example, an original placing table, and has a rectangular original placing plane 13 on which an original to be scanned is placed. Referring to the underside of the original placing table, a single encoder pattern unit 9 is provided on an end portion of the original placing plane 13 (a region in the vicinity of a side extending along the moving direction of the image sensor 5). In the encoder pattern unit 9, a pattern (in this case, black straight lines) is formed at a regular interval. Each pattern has a slant with respect to the main-scanning direction and the sub-scanning direction (a direction perpendicular to the main-scanning direction) and, thereby, the pattern has brightness information.

Figure 1B:
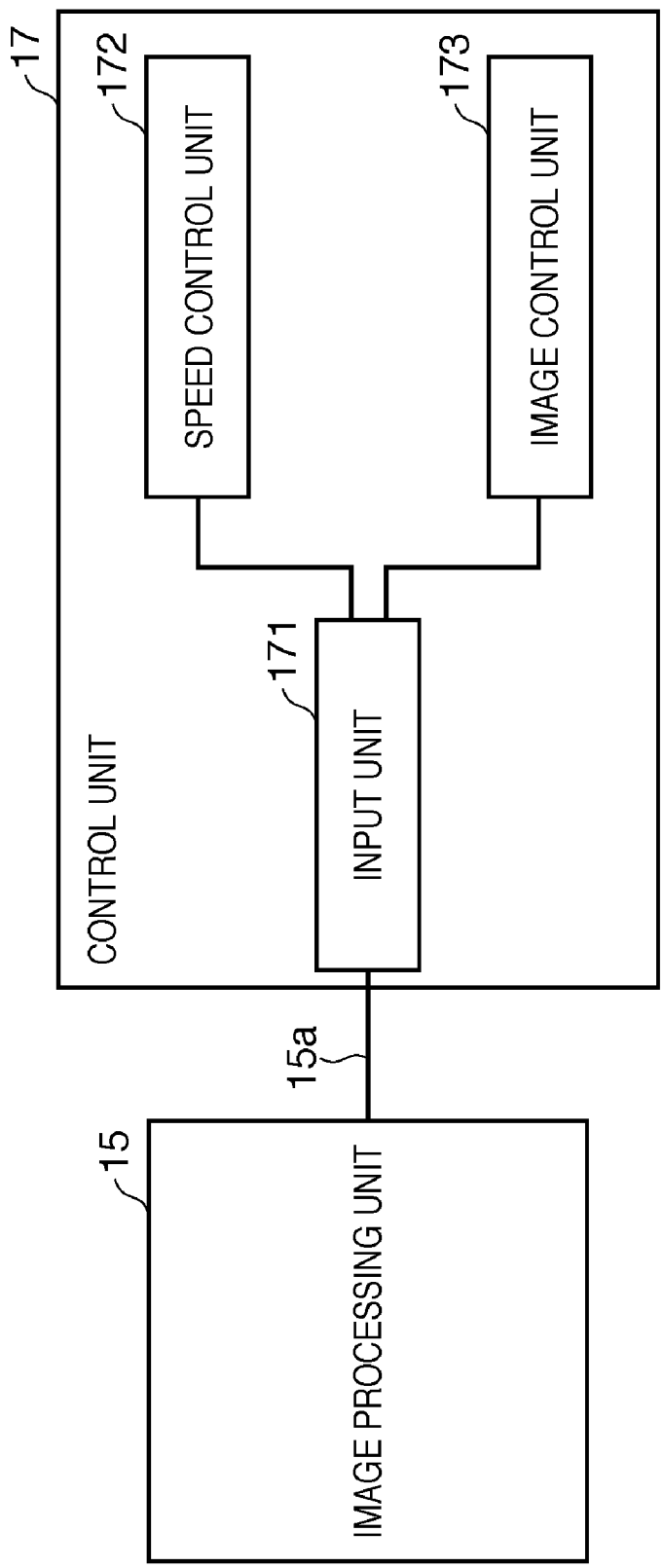
FIG. 1B is a diagram showing an example of a configuration of a control unit 17 shown in FIG. 1A.

The image sensor 5 simultaneously scans the original 11 and the encoder pattern unit 9. That is, the image sensor 5 scans the original 11 by using a plurality of light-receiving elements that are provided in the position corresponding to the original 11 and also scans the pattern by using a plurality of light-receiving elements provided in the position corresponding to the encoder pattern unit 9. FIG. 1B is a diagram showing an example of a configuration of a control unit 17. An input unit 171 receives an input of a digital image from the image processing unit 15, and divides the image into a digital image corresponding to the original 11 and a digital image corresponding to the encoder pattern unit 9. The input unit 171 outputs the digital image corresponding to the encoder pattern unit 9 to a speed control unit 172, and outputs the digital image corresponding to the original 11 to an image control unit 173.

A DC motor 1 moves the image sensor 5 in the sub-scanning direction via an image sensor driving belt 3. A motor driving circuit 19 controls the driving voltage of the DC motor 1 based on the control signal from the control unit 17.

Figure 2:
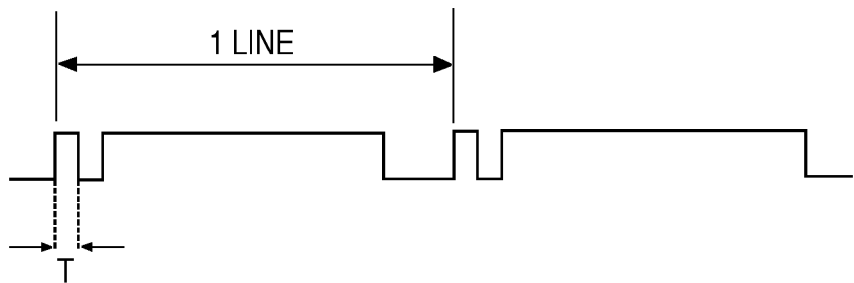
FIG. 2 is a diagram showing an example of a digital image signal.

A digital image signal when the image sensor 5 scans the original 11 is as shown by the signal output of FIG. 2. Here, an example is shown in which the entire surface of the original 11 is white. In the digital image signal shown in FIG. 2, a high level indicates white, and a low level indicates black or a no-signal section of the image sensor 5. In this digital image signal, the low level at the beginning is a no-signal section of the image sensor 5. A period indicated by an arrow representing one line corresponds to one line's worth of period that is output from the image sensor 5.

Figure 3:
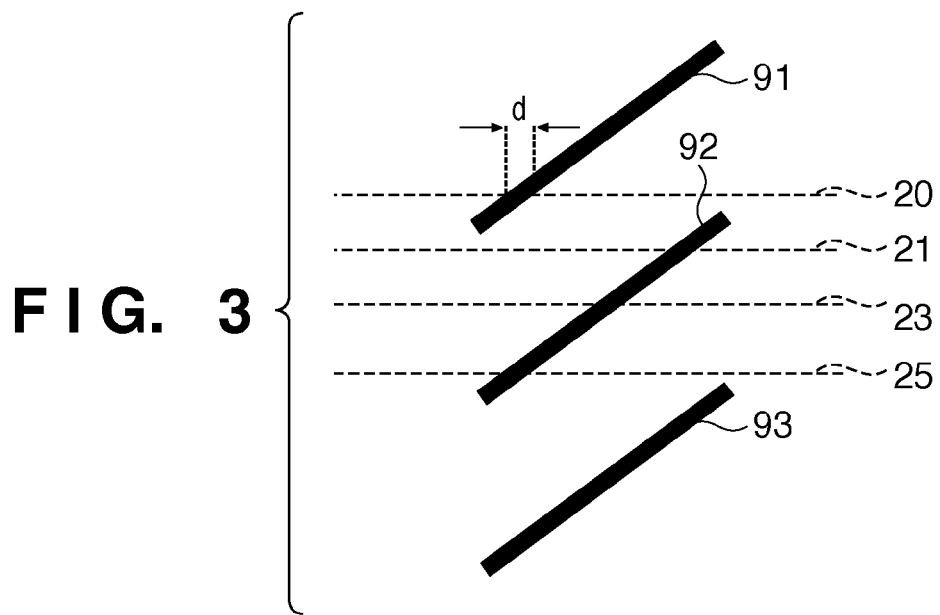
FIG. 3 is an enlarged view of an example of an encoder pattern unit 9 shown in FIG. 1A.

FIG. 3 is an enlarged view of an example of the encoder pattern unit 9 shown in FIG. 1A. Here, a description is given using black lines 91, 92 and 93. A period for which a range d of the black line 91 is scanned corresponds to a period T of FIG. 2.

Figure 4:
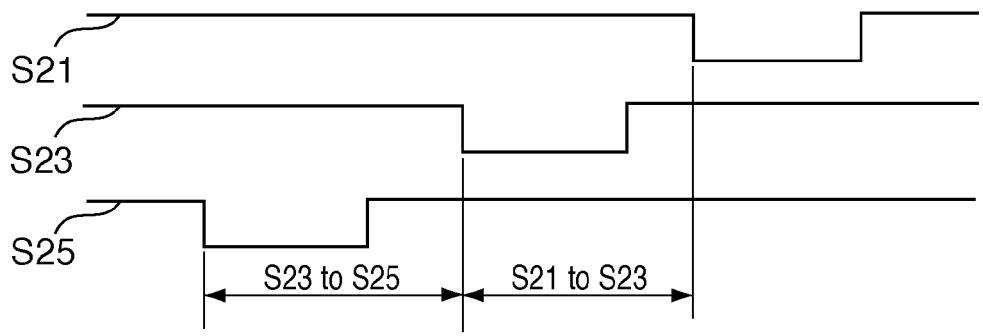
FIG. 4 is a diagram showing an example of digital image signals.

Horizontal broken lines indicate line scanning positions of the image sensor 5. In this case, the image sensor 5 scans a line at each of the positions indicated by reference numerals 20, 21, 23 and 25 while sequentially moving in a direction extending from reference numeral 20 to reference numeral 25. The digital image signals that are output to the signal line 15*a* (see FIG. 1B) at this time are shown in FIG. 4. A low level portion corresponds to the position at which a black line of the encoder pattern unit 9 is scanned. The difference in falling edge portions between a signal S21 and a signal S23 is a movement amount in the main-scanning direction in the encoder pattern unit 9. For example, if the linear image scanning density of the image sensor 5 is 600 dpi, and the difference is 10 pixels, the movement amount in the main-scanning direction between the scanning position 21 and the scanning position 23 will be 1/60 inches. However, such information is not sufficient to drive and control the image sensor 5 in the sub-scanning direction.

Accordingly, the control unit 17 calculates a movement amount in the sub-scanning direction of the image sensor 5 based on the difference in falling edge portions between the signal S21 and the signal S23 as drive information. Specifically, because the slant of the pattern of the encoder pattern unit 9 is preset, calculation is performed based on the slant information, the pixel difference in the main-scanning direction and the linear density in the main-scanning direction of the image sensor 5. For example, if the linear density of the image sensor 5 is 2400 dpi, the pixel difference in the main-scanning direction is 8 pixels, and the slant of the pattern is 5 in the sub-scanning direction with respect to 10 in the main-scanning direction, the movement amount in the sub-scanning direction will be $(8/2400) \times (5/10) = 1/600$ inches. Through such calculation, it is possible to obtain not only the position in the sub-scanning direction of the image sensor 5, but also a movement amount in the sub-scanning direction of the image sensor 5 per line-scanning cycle (a movement amount in the sub-scanning direction of the image sensor 5 after one line has been scanned).

The control unit 17 calculates a moving speed in the sub-scanning direction of the image sensor 5 from the movement amount in the sub-scanning direction of the image sensor 5 per line-scanning cycle as drive information. Then, the control unit 17 outputs the drive information (movement amount and moving speed) in the sub-scanning direction of the image sensor 5 to the motor driving circuit 19 as feedback information. Then, the motor driving circuit 19 controls the motor current based on the feedback information so as to control the DC motor 1 to thereby drive the DC motor 1.

Figure 8A:
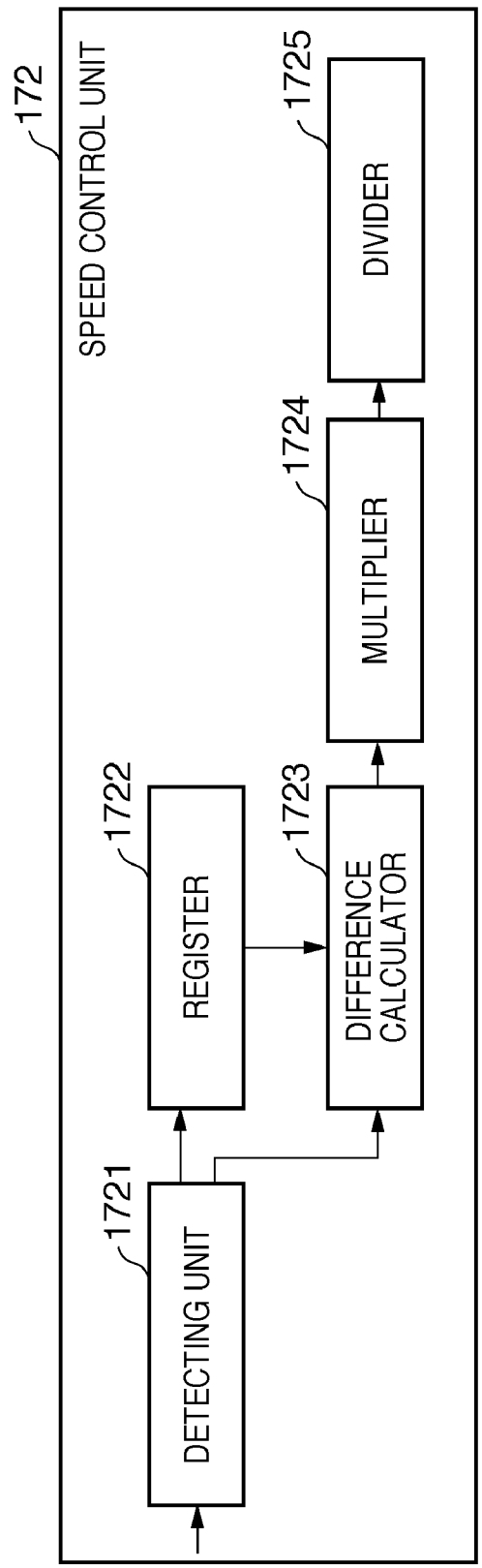
FIGS. 8A and 8B are diagrams showing examples of configurations of a speed control unit 172 shown in FIG. 1B.

FIG. 8A is a first diagram showing an example of a speed control unit 172 that executes the above-described process. The speed control unit 172 includes a detecting unit 1721, a register 1722, a difference calculator 1723, a multiplier 1724 and a divider 1725. The detecting unit 1721 includes a counter inside thereof, which counts the number of pixels when a signal's falling edge is detected. Here, a count value at the signal's high-level-to-low-level changing point is acquired. The count value is output to the register 1722 and the difference calculator 1723. The register 1722 in which the count value of the previous line (e.g., reference numeral 21 of FIG. 3) is stored outputs the stored count value to the difference calculator 1723 when a new count value (value of the line indicated by reference numeral 23 of FIG. 3) is input. That is, when a changing point at reference numeral 23 of FIG. 3 is detected, the count value of reference numeral 21 of FIG. 3 is input into the difference calculator 1723, and the difference between these count values is calculated. The calculation result is output to the multiplier 1724. The multiplier 1724 performs multiplication using a coefficient based on the slant with respect to the main-scanning direction (sub-scanning direction) of the encoder pattern to determine a moving distance value in the sub-scanning direction. The multiplier 1724 outputs the moving distance value in the sub-scanning direction, which corresponds to the distance between reference numerals 21 and 23 of FIG. 3, to the divider 1725. The divider 1725 divides the moving distance value in the sub-scanning direction by the time corresponding to the scanning cycle of the line sensor. With this division process, it is possible to acquire a moving speed in the sub-scanning direction.

The resolution in the sub-scanning direction can be changed by changing the slant of the pattern in the encoder pattern unit 9. That is, the resolution in the sub-scanning direction increases as the slant is made smaller (or in other words, the pixel difference in the sub-scanning direction with respect to the main-scanning direction is made smaller), as a result of which, it is possible to drive and control the image sensor 5 in the sub-scanning direction with higher accuracy.

In the case where the line scanning position of the image sensor 5 moves to the next pattern, the tailing edge portion moves in the opposite direction. In this case, a movement amount is calculated assuming that the movement amount in the sub-scanning direction per line-scanning cycle of the image sensor 5 is shorter than the length of the pattern in the sub-scanning direction (hereinafter referred to as one cycle in the sub-scanning direction of the pattern). Specifically, if the one-cycle width in the sub-scanning direction of each pattern is $1/200$ inches and the movement amount from the previous line scanning position is minus $2/600$ inches, the actual movement amount can be calculated to be $1/200-2/600=1/600$ inches.

Figure 8B:
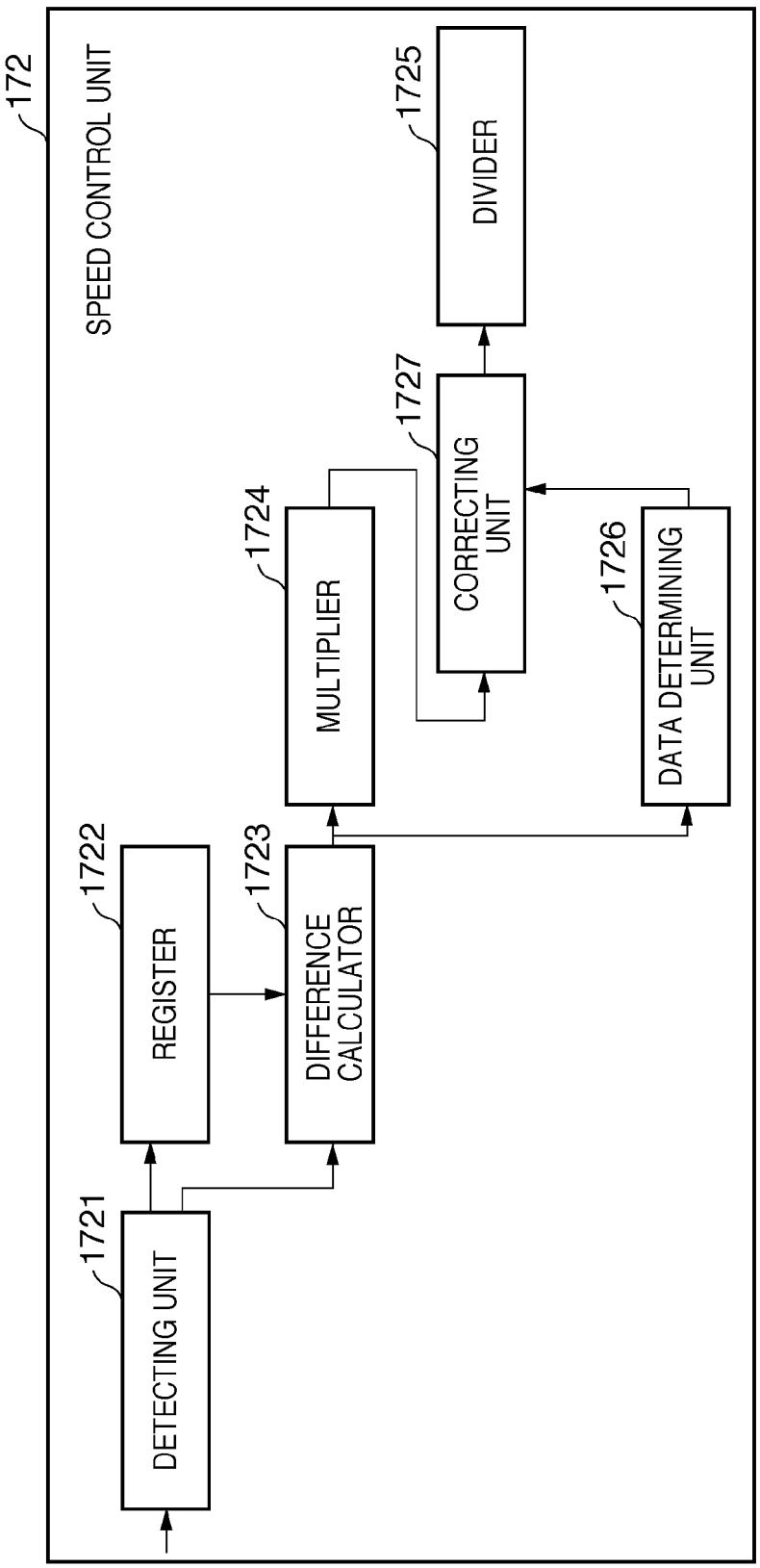

FIG. 8B is a second diagram showing an example of the speed control unit 172 that executes the above-described process. A description of the same components as those of FIG. 8A is omitted, and only differences will be described here. In FIG. 8B, a data determining unit 1726 and a correcting unit 1727 have been added. The data determining unit 1726 determines whether or not the result of calculation by the difference calculator 1723 is a negative value, and outputs the result of determination to the correcting unit 1727. The correcting unit 1727 corrects the result of calculation output from the multiplier 1724 based on the result of determination. If the result of determination is negative, a prescribed value is added to the result of calculation, and outputs the result of addition to the divider 1725. If, on the other hand, the result of determination is not negative, the result of calculation is output to the divider 1725 without performing addition on the result of calculation.

Figure 5:
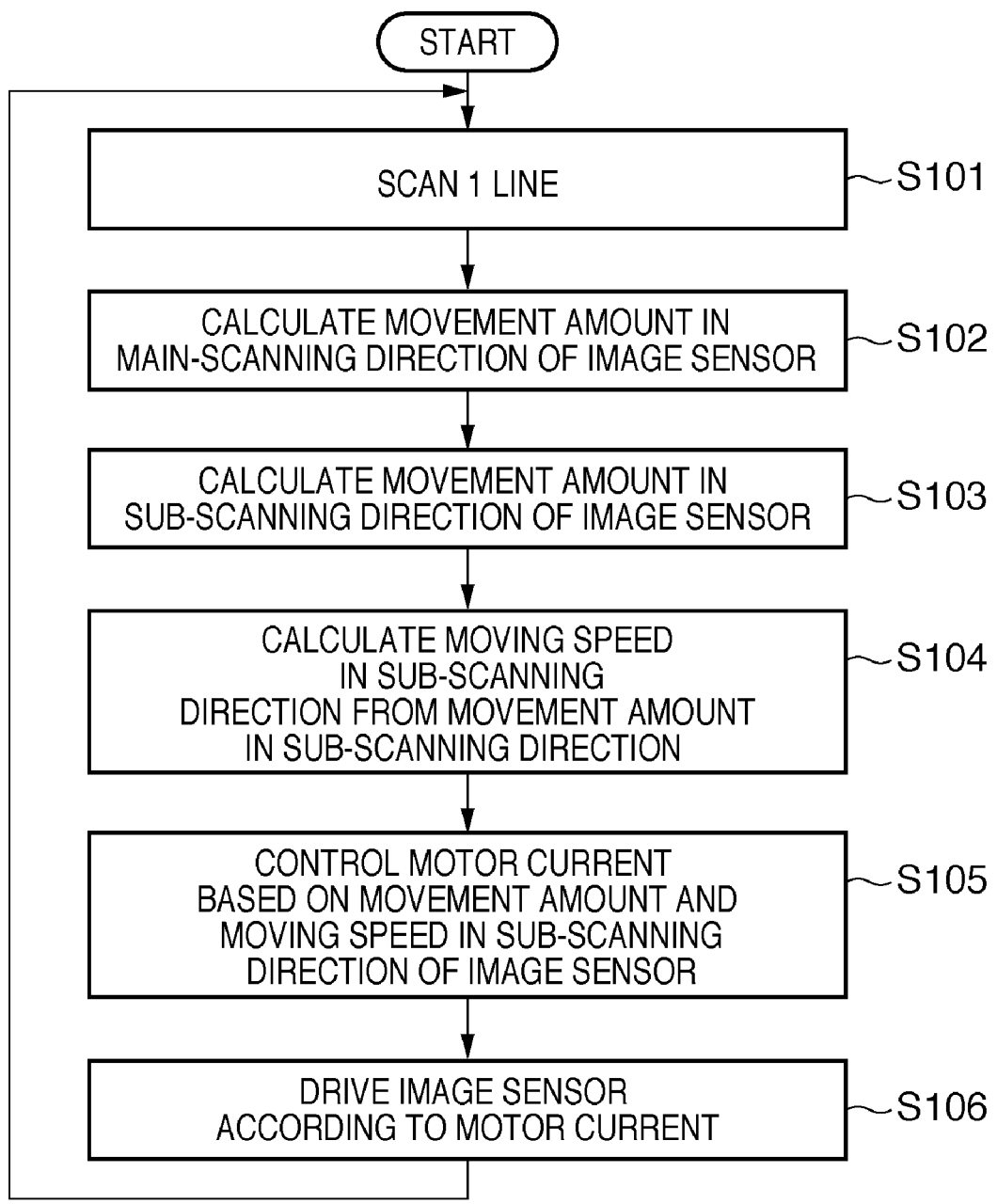
FIG. 5 is a flowchart showing an example of an operation performed by the original scanning apparatus shown in FIGS. 1A and 1B.

Next, an example of an operation performed by the original scanning apparatus shown in FIGS. 1A and 1B will be described with reference to FIG. 5. Here, by way of an example, an operation in which, when scanning an original, the position information and moving speed in the sub-scanning direction of the image sensor 5 are fed back so as to control the image sensor 5 to thereby drive the image sensor 5 will be described.

The original scanning apparatus first drives the image sensor 5 in the main-scanning direction to scan the original 11 as well as the encoder pattern unit 9 (S101). The original scanning apparatus causes the control unit 17 to calculate a movement amount in the main-scanning direction of the image sensor 5 (the positional difference in the main-scanning direction between the previous pattern scanning position and the current pattern scanning position) based on the result of scanning the encoder pattern unit 9 (S102).

Subsequently, the original scanning apparatus causes the control unit 17 to calculate a movement amount in the sub-scanning direction of the image sensor 5 (the positional difference in the sub-scanning direction between the previous pattern scanning position and the current pattern scanning position) (S103). This movement amount is calculated based on the movement amount (the pixel difference in the main-scanning direction) calculated in S102, the pattern slant information of the encoder pattern unit 9 which has been stored in advance, and the linear density in the main-scanning direction of the image sensor 5. The original scanning apparatus causes the control unit 17 to calculate a moving speed in the sub-scanning direction of the image sensor 5 based on the movement amount in the sub-scanning direction of the image sensor 5 calculated in S103 (S104).

After that, the control unit 17 of the original scanning apparatus outputs the drive information (movement amount and moving speed) in the sub-scanning direction of the image sensor 5 to the motor driving circuit 19 as feedback information. The motor driving circuit 19 then controls the motor current based on the feedback information (S105) so as to control the DC motor 1 to thereby drive the DC motor 1 (S106). The original scanning apparatus repeatedly executes the above process until the scanning of the original ends.

As described above, according to Embodiment 1, it is possible to obtain precise drive information in the sub-scanning direction while maintaining the line-scanning speed of the image sensor 5. Thus, for example, the moving speed in the sub-scanning direction of the image sensor 5 can be increased.

In addition, even when scanning is performed in a scan mode that has a different linear speed (linear density), control of the image sensor 5 in the sub-scanning direction can be performed using a single (one) encoder pattern unit 9.

Embodiment 2

Next, Embodiment 2 will be described. In Embodiment 2, the case will be described in which the movement amount in the sub-scanning direction of the image sensor 5 per line-scanning cycle exceeds one cycle of the pattern of the encoder pattern unit 9.

Figure 6:
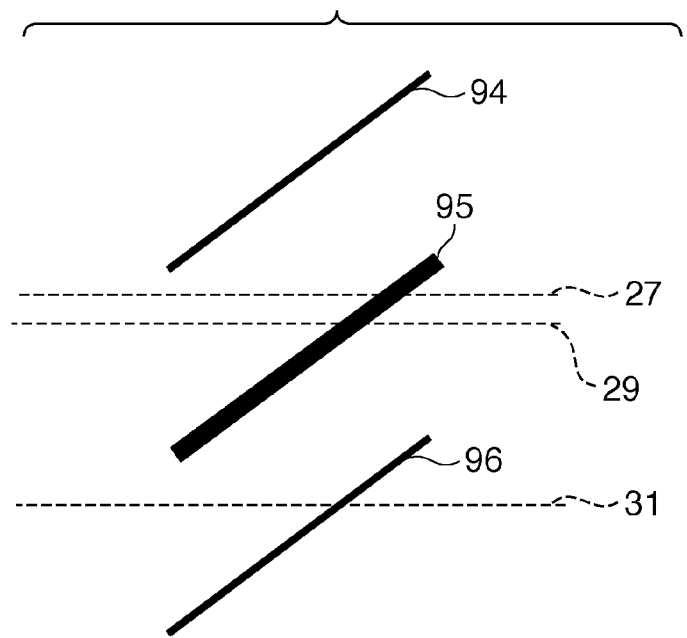
FIG. 6 is an enlarged view of an example of an encoder pattern unit 9 according to Embodiment 2.
Figure 7:
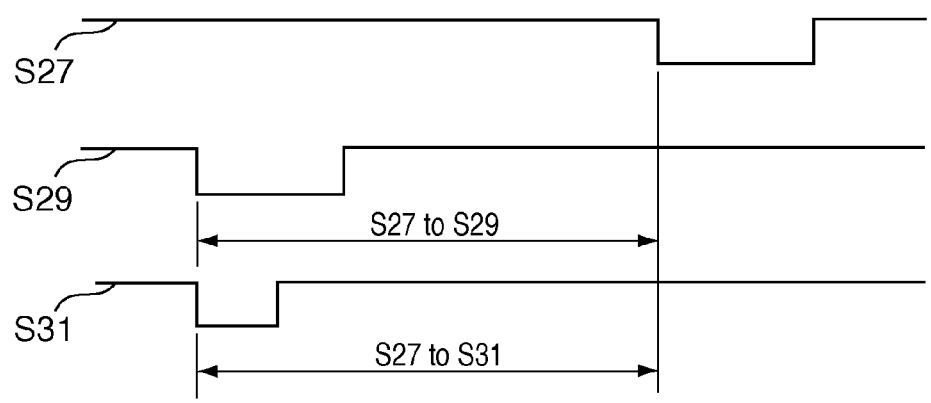
FIG. 7 is a diagram showing an example of digital image signals according to Embodiment 2.

In FIG. 6, a scanning position 27, a scanning position 29 and a scanning position 31 are shown. The movement amount of the scanning position 29 with respect to the scanning position 27 and that of the scanning position 31 with respect to the same are significantly different, whereas the falling edges of the digital image signals are at the same position as shown in FIG. 7. Because a difference cannot be distinguished in this state, the drive information (movement amount and moving speed) on the image sensor 5 cannot be acquired when the movement amount in the sub-scanning direction of the image sensor 5 exceeds one cycle of the pattern. Ordinarily, in order to avoid such a situation, a maximum value for the moving speed is set, and control is performed so as not to exceed the maximum value.

In Embodiment 2, as shown in FIG. 6, the thicknesses of black lines of the pattern are set to be different from each other without changing the pitch of a white-to-black border portion of the pattern. That is, the black lines of the pattern have the same thickness in Embodiment 1, but a plurality of thicknesses is provided in Embodiment 2. In FIG. 6, two different thicknesses are set for the black lines of the pattern unit 9. Black lines 94, 95 and 96 are disposed such that adjacent black lines have different thicknesses. In this case, due to such different thicknesses of the black lines, the length of the low level periods of the digital image signals S27, S29 and the length of the low level period of the digital image signal S31 are different as shown in FIG. 7.

Accordingly, the control unit 17 detects such a difference in the low-level periods, and calculates a movement amount in the sub-scanning direction of the image sensor 5 according to the result of detection. That is, whether the scanning position is 29 or 31 is determined by detecting such a difference in the low level periods. As for the moving speed, it can be obtained through the same calculation as Embodiment 1 described above. The thicknesses of black lines of the encoder pattern unit 9 may be any thickness as long as the thicknesses of black lines can be distinguished, and there may be two or more.

As described above, according to Embodiment 2, even when the movement amount in the sub-scanning direction of the image sensor 5 per line-scanning cycle exceeds one cycle of the pattern, the same effect as that of Embodiment 1 can be obtained.

Thus far, examples of representative embodiments of the present invention have been described, but the present invention is not limited to the above description and the embodiments shown in the drawings, and the present invention can be modified as appropriate without departing from the gist thereof.

According to the present invention, it is possible to obtain precise drive information in the sub-scanning direction while maintaining the line-scanning speed of the scanning unit. Accordingly, the moving speed in the sub-scanning direction of the scanning unit can be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-311557 filed on Dec. 5, 2008, which is hereby incorporated by reference herein in its entirety.

What is claimed is:

1. An original scanning apparatus that scans an original placed on an original placing plane line by line by moving a scanning unit comprising a plurality of light-receiving elements that are arranged in a prescribed direction in a direction perpendicular to the prescribed direction, the apparatus comprising:
   a pattern unit that is provided in a vicinity of a side of the original placing plane extending along a moving direction of the scanning unit;
   a control unit configured to calculate drive information in the moving direction per line-scanning cycle of the scanning unit based on a result of scanning the pattern unit by using a plurality of light-receiving elements that are provided at a position corresponding to the pattern unit from among the plurality of light-receiving elements; and
   a driving circuit configured to feed back the drive information calculated by the control unit so as to control the scanning unit to thereby drive the scanning unit in the moving direction,
   wherein, in the pattern unit, lines each having a slant with respect to the prescribed direction are formed at a regular interval in the moving direction of the scanning unit.

2. The original scanning apparatus according to claim 1, wherein the control unit calculates a movement amount in the moving direction per line-scanning cycle of the scanning unit and a moving speed thereof based on the movement amount, and
the driving circuit feeds back position information and moving speed calculated by the control unit so as to control the scanning unit to thereby drive the scanning unit in the moving direction.

3. The original scanning apparatus according to claim 1, wherein, when a length of the line in the moving direction of the scanning unit is defined as one cycle, the driving circuit controls the scanning unit so as to drive the scanning unit such that the movement amount in the moving direction per line-scanning cycle of the scanning unit is shorter than one cycle of the line.

4. The original scanning apparatus according to claim 1, wherein lines that are formed at a regular interval in the moving direction of the scanning unit have the same thickness.

5. The original scanning apparatus according to claim 1, wherein the lines formed at a regular interval in the moving direction of the scanning unit have a plurality of different thicknesses, and
when a length of the line in the moving direction of the scanning unit is defined as one cycle, the control unit detects that a movement amount in the moving direction per line-scanning cycle of the scanning unit has exceeded one cycle of the line based on a result of scanning by the scanning unit caused by different line thicknesses, and calculates the drive information in the moving direction per line-scanning cycle of the scanning unit based on a result of detection.

6. A control method of an original scanning apparatus that scans an original placed on a original placing plane line by line by moving a scanning unit comprising a plurality of light-receiving elements that are arranged in a prescribed direction in a direction perpendicular to the prescribed direction, the method comprising steps of:
   controlling so as to calculate drive information in a moving direction per line-scanning cycle of the scanning unit based on a result of scanning a pattern unit that is provided in a vicinity of a side of the original placing plane extending along the moving direction of the scanning unit by using a plurality of light-receiving elements that are provided at a position corresponding to the pattern unit from among the plurality of light-receiving elements; and
   controlling the scanning unit so as to drive the scanning unit in the moving direction by feeding back the drive information calculated in the control step,
   wherein, in the pattern unit, lines each having a slant with respect to the prescribed direction are formed at a regular interval in the moving direction of the scanning unit.

* * * * *